(12) United States Patent
Banerji et al.

(10) Patent No.: US 11,796,090 B2
(45) Date of Patent: Oct. 24, 2023

(54) FLUID TRANSPORT TUBING INCORPORATING A GRAPHENE IMPREGNATED OUTER COATING

(71) Applicant: Martinrea International US Inc., Auburn Hills, MI (US)

(72) Inventors: Anindya Banerji, Windsor (CA); Cory Doble, Ortonville, MI (US); Ganesh Iyer, Oakland Township, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 62 days.

(21) Appl. No.: 17/462,518

(22) Filed: Aug. 31, 2021

(65) Prior Publication Data

US 2022/0074525 A1 Mar. 10, 2022

Related U.S. Application Data

(60) Provisional application No. 63/074,641, filed on Sep. 4, 2020.

(51) Int. Cl.
| | |
|---|---|
| *F16L 9/14* | (2006.01) |
| *F16L 58/08* | (2006.01) |
| *B21C 23/22* | (2006.01) |

(52) U.S. Cl.
CPC .............. *F16L 9/14* (2013.01); *B21C 23/22* (2013.01); *F16L 58/08* (2013.01)

(58) Field of Classification Search
CPC .............. F16L 6/14; F16L 58/08; B21C 23/22
USPC ........................................................ 138/146
See application file for complete search history.

(56) References Cited

U.S. PATENT DOCUMENTS

| | | | |
|---|---|---|---|
| 6,915,820 B2 | 7/2005 | Picco et al. | |
| 9,556,358 B2 | 1/2017 | Berger et al. | |
| 10,337,660 B2 | 7/2019 | Kawai et al. | |
| 10,625,487 B2 | 4/2020 | Kerin, Jr. et al. | |
| 2018/0045357 A1 | 2/2018 | Kawai et al. | |
| 2018/0119871 A1 | 5/2018 | Kawai et al. | |
| 2020/0041063 A1* | 2/2020 | Kerin, Jr. .............. | B21C 37/154 |

\* cited by examiner

*Primary Examiner* — Craig M Schneider
*Assistant Examiner* — David R Deal
(74) *Attorney, Agent, or Firm* — Dinsmore & Shohl LLP (57) ABSTRACT

An article and method for forming a coated metal pipe for use as an automotive fluid transport tube including a copper plated carbon steel tubing formed into a circular cross sectional profile. At least one intermediate layer including any of a corrosion inhibiting zinc/aluminum alloy, electroplated zinc or hot dip aluminum is applied over said tubing. One or more outer polymer or copolymer layers are applied over the intermediate layer, with the outer layer or multilayers compounded with a graphene or graphene oxide powder.

21 Claims, 5 Drawing Sheets

FLUID TRANSPORT TUBING INCORPORATING A GRAPHENE IMPREGNATED OUTER COATING

CROSS REFERENCE TO RELATED APPLICATIONS

The present application claims the priority of U.S. Ser. No. 63/074,641 filed Sep. 4, 2020.

FIELD OF THE INVENTION

With reference to the following description, the present invention relates to and discloses automotive fluid transport tubes and related methods of manufacturing. According to the non-limiting embodiments described below, the tube is constructed of a Cu-plated low carbon steel and includes a corrosion inhibiting intermediate layer not limited to any of a zinc/aluminum, electroplated zinc or hot dip aluminum intermediate layer. Additional layers may include any of chrome free conversion coating for passivation, an electroplated zinc or a hot dip aluminum, along with a solvent based primer layer along with an outermost coating of a material incorporating a graphene powder. The outermost coating can include either a single or multiple subset (multi) layers and can be constructed, without limitation, from any extruded polymer or copolymer reinforced with the graphene or graphene-oxide powder. The mechanical properties of the graphene compounded polymer or copolymer depends on the graphene loading—higher loading of graphene provides higher strength. The polymer or copolymer used may be any of a thermoplastic, thermoset, elastomer or other natural or synthetic polymers and may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

DESCRIPTION OF THE BACKGROUND ART

Fluid transport tubing in vehicles perform the critical function of carrying fuel, brake fluids and transmission oil coolants during vehicle operation. Addressing specifically a fuel line tube, these are usually constructed of single-wall furnace welded low carbon steel, owing to its ease of formability and low cost of raw material. Brake line tubes are usually configured as double walled brazed tubing, and as required to sustain fluids at higher pressures. Contributing factors to the failure of the low carbon steel tubing can be due to any of abrasion, corrosion or stone-impacts, such as which can compromise safe operation of the automotive vehicle.

To reduce vulnerability to corrosion, a Zinc-Aluminum alloy, electroplated Zinc or hot dip aluminum maybe applied directly on the steel tubing. In order to protect the corrosion inhibiting layer from harsh environmental conditions and stone impingement a thermoplastic polymer layer is usually extruded as a top-coat. In use, the thermoplastic polymer layer may be exposed to broken clips, exposed wiring, or plastic convolutes, depending on the location of the tubing, and under cyclic or continuous contact conditions lead to breach of the thermoplastic polymer layer. In order to further protect this thermoplastic polymer layer, another layer of polymer, usually of multifold thickness, is added either in the form of a heat shrink polymer or another extruded layer. The mentioned tubing construction, while commonly prevalent in the automotive industry, is not an efficient design as it not only adds to the weight of the overall tubing but also involves additional manufacturing steps and related cost.

As is also known, graphene is a two-dimensional planar nanomaterial comprising of $sp^2$ bonded carbon atoms packed in the honeycomb lattice. Many of the material properties, such as high tensile strength, high thermal and electrical conductivity, that makes graphene lucrative stems from the unique bonding structure of the planar graphene. However, the application of graphene at a macroscopic scale for applications as in the automotive industry continues to be a challenge.

Given the above background description, U.S. Pat. No. 10,625,487, to Kerin, Jr. et al., teaches a coated metal pipe for use as an automotive fluid transport tube and including any of a single or double walled tubing formed into a circular cross sectional profile. An intermediate primer layer is applied over the tubing. A polyamide incorporating a graphene powder is further applied over the intermediate layer.

A further example of the prior art is shown by the automotive fluid tubing of Picco et al., U.S. Pat. No. 6,915,820 which is configured for carrying any of gasoline/diesel fuel or hydraulic fluid and is composed of a metal with a coating of aluminum, over which is extrusion coated a polyamide 12 layer and for improving the wear-resistance and corrosion-resistance of the tubing.

Berger et al., U.S. Pat. No. 9,556,358, teaches a method for coating of a metallic article, in which the metal surface is coated with a polymer or a two-component system that reacts to form a polymer following application to the metal surface. The composition includes a 70-2700 meq/kg olefinic double bonds which leads to stronger adhesion and to increased corrosion resistance.

US 2018/00453257, to Kawai et al., teaches a multi-layer coated film applied to a metal pipe and which covers an outer circumferential surface of the pipe. The coating film includes a chemical conversion layer containing a zirconium oxide and/or zirconium hydroxide. A primate layer contains a polyamide imide and/or an epoxy resin.

US 2018/0119871, also to Kawai, teaches a coated metal pipe in which the multilayered coating includes a chemical conversation layer and a primer layer which further includes a polyamide imide and at least one kind of additive component selected from a polyamide, a fluorine resin, a silane coupling agent, and an epoxy resin.

SUMMARY OF THE PRESENT INVENTION

The present invention discloses an automotive fluid transport tube including any of a single or double walled tubing formed into a circular cross sectional profile. The tube is constructed of a Cu-plated low carbon steel and includes a corrosion inhibiting intermediate layer not limited to any of a zinc/aluminum, electroplated zinc or hot dip aluminum intermediate layer. Additional layers may include either of an optional chrome free conversion coating for passivation, an electroplated zinc or hot dip aluminum, along with a solvent based primer layer and an outermost coating of a material incorporating a graphene powder.

The outermost coating can include a single or multiple layers and can be constructed, without limitation, from any extruded polymer or copolymer reinforced with the graphene or graphene oxide powder. The mechanical properties of the graphene compounded polymer or copolymer depends on the graphene loading—higher loading of graphene provides higher strength. The polymer used may be any of a thermoplastic, thermoset, elastomer or other natural or synthetic polymers and may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With non-limiting reference to the attached drawings the present invention teaches an automotive fluid transport tube of varying compositions, each of which being coated with a corrosion, abrasion and impact resistant multi-layer or mono coating system. The present invention also teaches a related method of manufacturing any tube covered under the present system, article or assembly.

In each variant disclosed, the tubing includes an outermost coating (including single and multi-layers) of an extruded polymer or co-polymer material incorporating a graphene powder, such providing high wear resistance and superior insulating properties. For purposes of the present invention, the various ranges of coating thickness described subsequently herein are understood to represent preferred but non-limiting embodiments, and it is envisioned that other ranges can be employed unless otherwise indicated.

Figure 1:
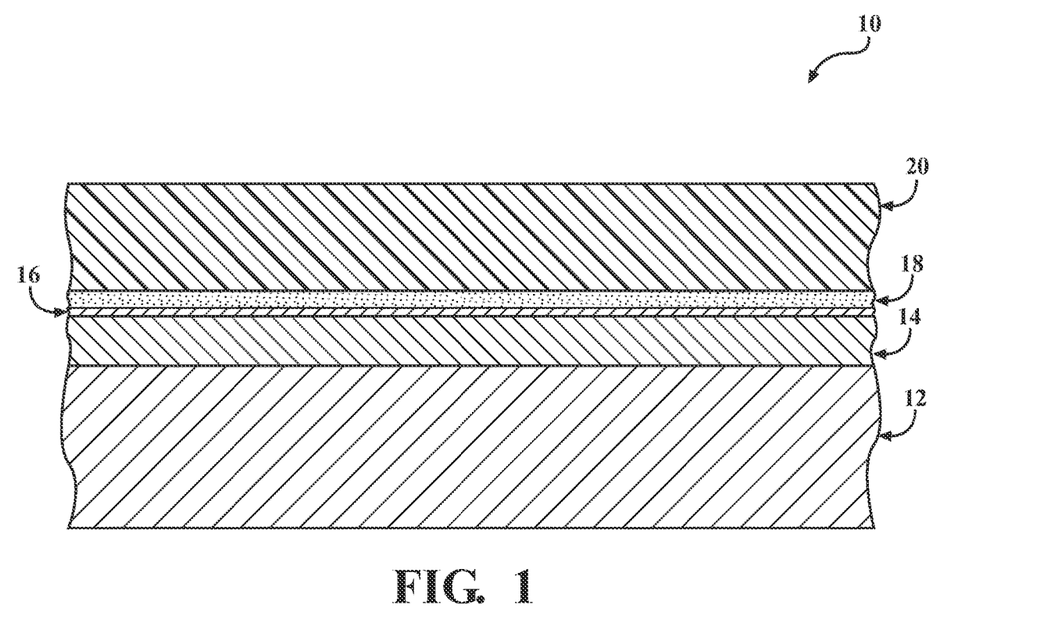
FIG. 1 is a length cutaway illustration of a wall segment of an automotive fluid transport tube according to a first non-limiting embodiment and depicting a first layer of a copper plated low carbon steel roll formed and brazed double wall tubing, a second layer of a hot dipped zinc/aluminum alloy, an optional third layer of a chrome free conversion coating, a fourth layer of a solvent based primer coating and a fifth layer of an extruded polymer reinforced with a graphene or graphene oxide powder.

Referring initially to FIG. 1, a length cutaway illustration is generally shown at 10 of a wall segment of an automotive fluid transport tube according to a first non-limiting embodiment. The variant 10 of FIG. 1 includes a plurality of five layers and depicts a first layer 12 of a copper plated low carbon steel roll formed and brazed double wall tubing. Without limitation, the first layer can be further nickel coated on its inner diameter. A second layer 14 of a hot dipped zinc/aluminum (Galfan) alloy, such as by non-limiting example being applied at 5-12 micrometer (one millionth of a meter) thickness is applied over the first layer 12. An optional third layer 16 of a chrome free conversion coating (such as applied at a non-limiting thickness range of 0.2-0.4 micrometer) is applied over the third layer for providing passivation of the metal by coating with an inert layer.

A fourth layer 18 of a solvent based primer coating (such as by example but not limited to three micrometers) is then applied over the conversion coating 16. Solvent based coatings are understood to contain higher levels of organic compounds in comparison to water-based coatings and facilitate the application, drying and formation of a durable film. Finally, a fifth layer 20 of an extruded polymer or co-polymer top coat is applied over the primer coating, such as being reinforced with an extruded graphene or graphene oxide powder. As is known, graphene is a material constructed by carbon atoms bonded together in a repeating pattern of hexagons, whereas graphene oxide is an oxidized from of graphene laced with oxygen containing groups.

The mechanical properties of the graphene compounded polymer depicted in any of the related variants depends upon the graphene loading, with higher loadings of graphene providing higher strength. While not limiting to any specific loading, one non-limiting example can provide for loading in a range of 0.1% up to 25% by weight of graphene or graphene oxide with the desired polymer/copolymer matrix.

The range of polymers employed in the top coat or layer 20 can further include any of thermoplastic, thermoset, elastomer or other natural or synthetic polymers and may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane. It is further understood that this range of materials is applicable to the outer extruded layers according to any of the related variants FIGS. 2-10 subsequently described.

Without limitation, the outer layer 20 can further be reinforced with a two-dimensional allotrope of carbon such as graphene or arrangement of carbon nanotubes. Powdered multilayered graphene, such as which is fabricated by exfoliation techniques, is compounded with the outer layer by any range or percentage by weight loading. In each instance, the end goal is to provide superior properties to the outer layer of polymer material produced such that it exhibits improved mechanical properties, superior wear resistance and well as enhanced barrier resistance (such as protecting the interior of the tubing of heat/cold temperature extremes as well as establishing hydrophobic properties), as well as increased impact resistance to the underlying steel tubing.

As is also known, graphene is an atomic scale hexagonal lattice made of carbon atoms one atom layer in thickness. As is further known, graphene is a one-atom-thick planar sheet of sp2-bonded carbon atoms that are densely packed in a honeycomb crystal lattice. Graphene can be viewed as an atomic-scale chicken wire made of carbon atoms and their bonds. The name comes from GRAPHITE+-ENE, and in which graphite itself consists of many graphene sheets stacked together.

The carbon-carbon bond length in graphene is approximately 0.142 nm. Graphene is the basic structural element of some carbon allotropes including graphite, carbon nanotubes and fullerenes. It can also be considered as an infinitely large aromatic molecule, the limiting case of the family of flat polycyclic aromatic hydrocarbons called graphenes. Measurements have shown that graphene has a breaking strength 200 times greater than steel, making it the strongest material ever tested. Accordingly, and as supported by the present description, a graphene powder combined with a variety of outer coating extruded polymers materials provides an environmental protective outer or top coat covering which provides superior corrosion, abrasion and impact resistance.

Figure 2:
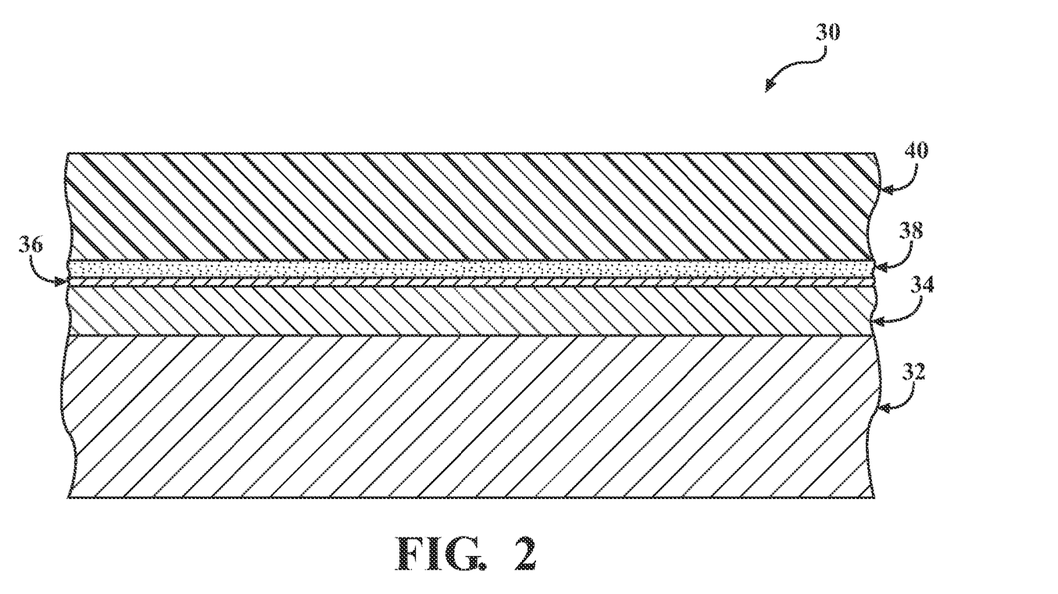
FIG. 2 is a length cutaway illustration of a wall segment of an automotive fluid transport tube according to a second non-limiting embodiment and depicting a first layer of a copper plated low carbon steel with brazed double wall tubing, a second layer of a corrosion inhibiting electroplated zinc, an optional conversion coating for passivation, a solvent based primer layer and a top coat protective layer of an extruded polymer reinforced with graphene or graphene oxide powder.

Referring to FIG. 2, a length cutaway illustration is generally shown at 30 of a wall segment of an automotive fluid transport tube according to a second non-limiting embodiment and depicting a first layer 32 of a copper plated low carbon steel with brazed double wall tubing. A second layer of an electroplated zinc 34 is applied for corrosion protection over the steel tube, such as by hot dipping. An optional third layer 36 of a chrome free passivation inducing conversion coating is applied over the electroplated zinc coating 34, with a fourth solvent based or primer coating 38 and a fifth layer 40 of an extruded polymer or copolymer layer reinforced with a graphene or graphene oxide powder provided as a top protective layer.

As with the example of FIG. 1 (at 20), the fifth (outer) layer 40 can further be reinforced with a two-dimensional allotrope of carbon such as graphene, graphene oxide or arrangement of carbon nanotubes. Powdered multilayered graphene, such as which is fabricated by exfoliation techniques, is compounded with the polyamide at any percent by weight loading. In each instance, the end goal again is to provide superior properties to the extruded outer polymer or copolymer (such as which can be selected from any of the listing presented in reference to layer 20) such that it exhibits improved mechanical properties, superior wear resistance as well as enhanced barrier resistance and impact resistance to the steel tubing.

Figure 3:
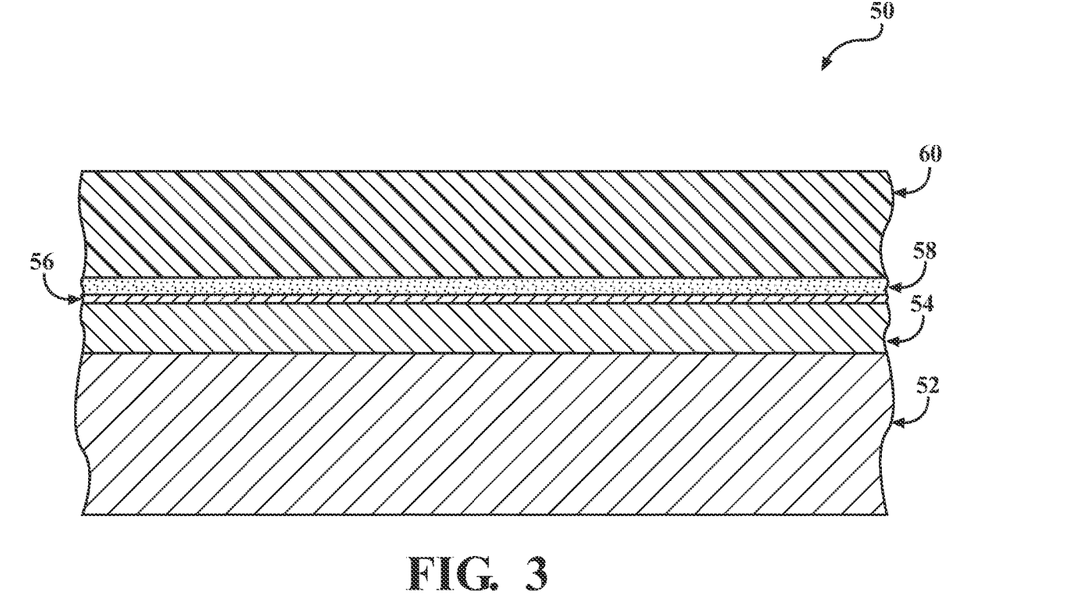
FIG. 3 is a length cutaway illustration of a wall segment of an automotive fluid transport tube according to a third non-limiting embodiment and depicting a first layer of a low carbon steel roll-formed single wall tubing with contact welding, which may be nickel plated, a second layer of a zinc/aluminum alloy for corrosion protected, an optional chrome free conversion coating, a fourth layer solvent based primer layer, and a fifth outer protective layer of an extruded polymer reinforced with graphene or graphene oxide powder.

Proceeding to FIG. 3, a length cutaway illustration is generally depicted at 50 of a wall segment of an automotive fluid transport tube according to a third non-limiting embodiment and depicting a first layer 52 of a low carbon steel with contact welded single wall tubing which may be nickel plated. A second layer 54 of a zinc aluminum alloy is applied over the steel tube for inhibiting corrosion. An optional chrome free conversion coating 56 (FIG. 3) is applied over the zinc/aluminum alloy 54, over which is applied a fourth solvent based primer coating 58 according to any desired thickness.

A fifth layer 60 of an extruded polymer or copolymer reinforced with combined with a graphene powder as a top protective layer. The fifth layer 60 exhibits similar properties and characteristics to those described at 20 in FIG. 1 and at 40 in FIG. 2, and can be applied according to any thickness, such including, without limitation in one example, being in a range of not less than fifty to one hundred and fifty micrometers.

Figure 4:
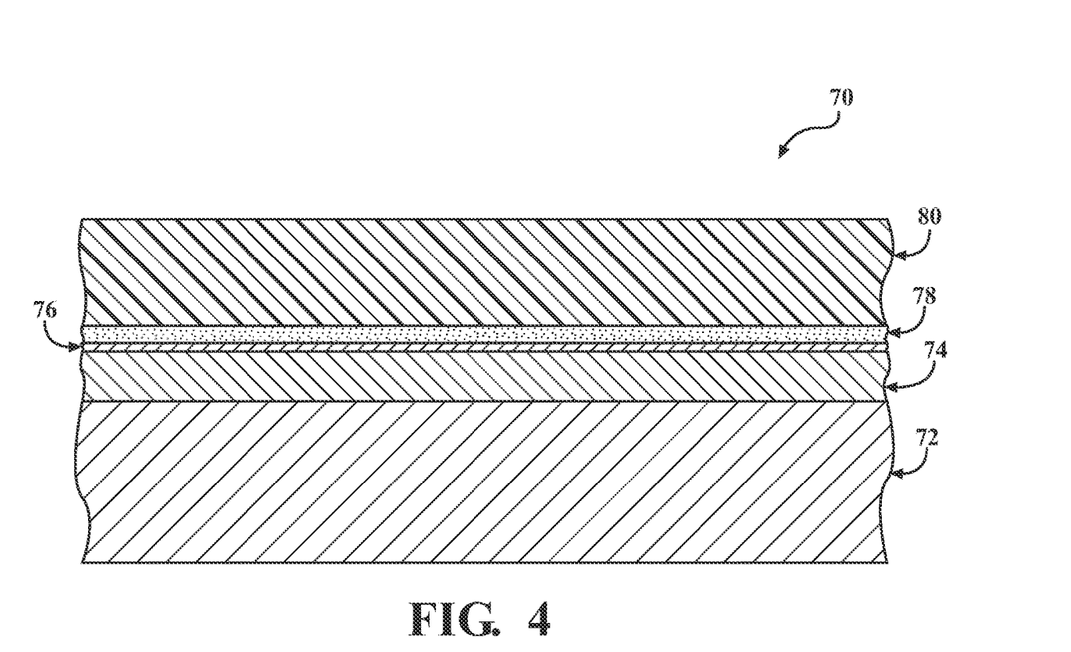
FIG. 4 is a length cutaway illustration of a wall segment of an automotive fluid transport tube according to a fourth non-limiting embodiment and depicting a first layer of a roll formed and welded single wall tube made of low carbon steel, which may be nickel plated, a second layer of an electroplated zinc for corrosion protection, an optional conversion coating for passivation, a solvent based primer layer and a top coat of extruded polymer reinforced with graphene or graphene oxide powder.

Proceeding to FIG. 4, a length cutaway illustration is generally shown at 70 of a wall segment of an automotive fluid transport tube according to a fourth non-limiting embodiment and depicting a first layer 72 of a roll formed and welded single wall tube made of low carbon copper plated steel, which may or may not have a nickel plating. A second electroplated zinc layer 74 (such as three micrometers in thickness in one non-limiting variant) is applied over the base steel tube 72 for corrosion protection.

An optional third layer 76 of a conversion coating is again provided for passivation, followed by a fourth solvent based primer layer 78, with a top coat layer 80 of an extruded polymer or copolymer reinforced with a graphene powder extruded onto the primer coating and functioning as a top protective layer. As with the layers 20, 40, and 60 in the preceding embodiments, the outer polymer or copolymer layer with extruded graphene or graphene oxide powder provides the coated metal tube with enhanced mechanical properties, (environmental) barrier resistance and impact resistance over prior art coatings.

Figure 5:
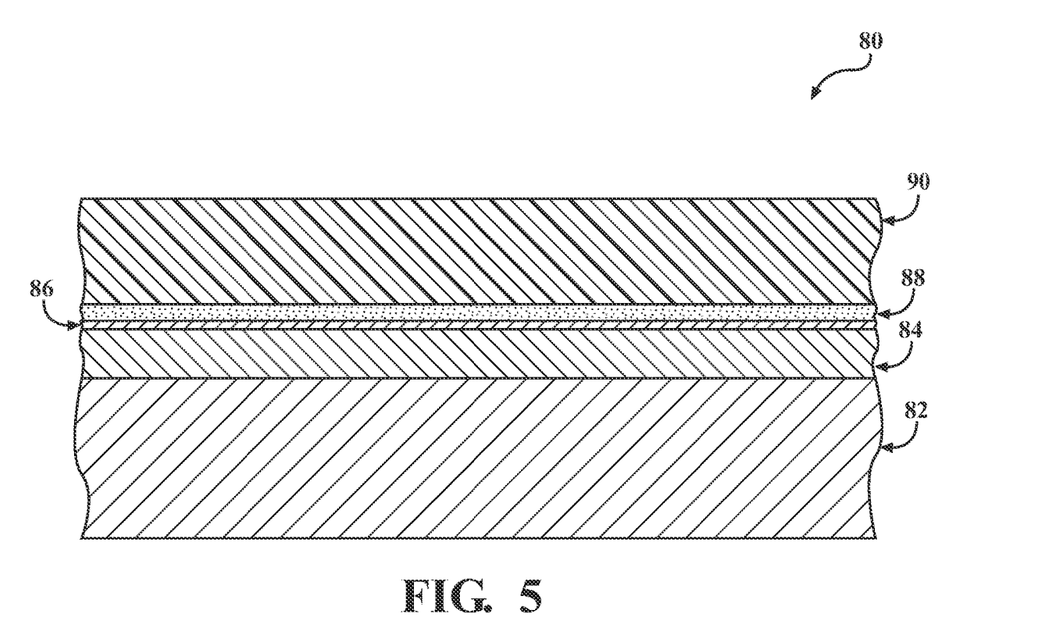
FIG. 5 is a length cutaway illustration of a wall segment of an automotive fluid transport tube according to a fifth non-limiting embodiment and depicting a first layer of a low carbon steel with welded single wall or double walled brazed tubing, a second layer of a hot-dip aluminum for corrosion protection, an optional conversion coating for passivation, a solvent based primer layer, and a top coat of an extruded polymer reinforced with graphene or graphene oxide powder.

FIG. 5 is a length cutaway illustration, generally at 80, of a wall segment of an automotive fluid transport tube according to a fifth non-limiting embodiment and depicting a first layer 82 of a copper plated low carbon steel with either of welded single wall tubing or double wall brazed tubing of a given wall thickness. A second hot dip aluminum layer 84 is applied over the steel tube for corrosion protection, followed by an optional conversion coating 86 for passivation and a subsequent solvent based primer layer 88. A top coat layer of an extruded polymer or copolymer 90 entrained with a graphene or graphene oxide powder functions as a top protective layer applied over the solvent based layer 88.

Figure 6:
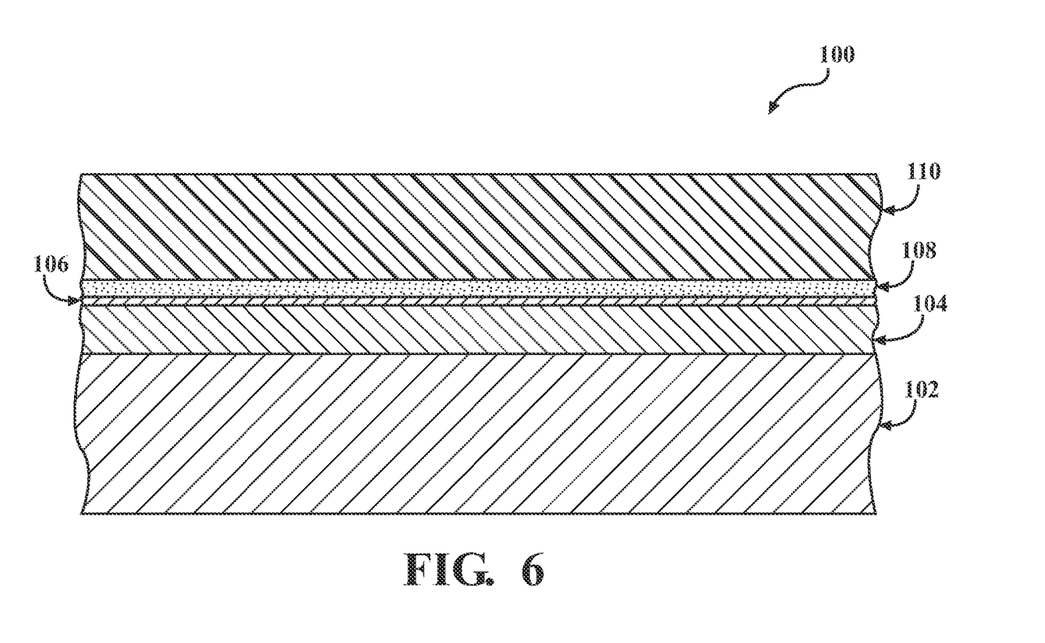
FIG. 6 is a length cutaway illustration of a wall segment of an automotive fluid transport tube according to a sixth non-limiting embodiment and depicting a first layer of a low carbon steel with welded single wall or double walled brazed tubing, a second layer of a zinc/aluminum alloy, electroplated zinc, or hot-dip aluminum for corrosion protection, an optional conversion coating for passivation, a solvent based primer layer, and a top coat of an extruded copolymer reinforced with graphene or graphene oxide powder.

Proceeding to FIG. 6, a length cutaway illustration is generally depicted at 100 of a wall segment of an automotive fluid transport tube according to a sixth non-limiting embodiment and depicting a first layer of a copper plated low carbon steel with welded single wall or double walled brazed tubing 102, a second layer of a zinc/aluminum alloy, electroplated zinc, or hot-dip aluminum 104 for corrosion protection, an optional conversion coating for passivation 106, a solvent based primer layer 108, and a top coat of an extruded polymer or copolymer 110 reinforced with graphene or graphene oxide powder.

Figure 7:
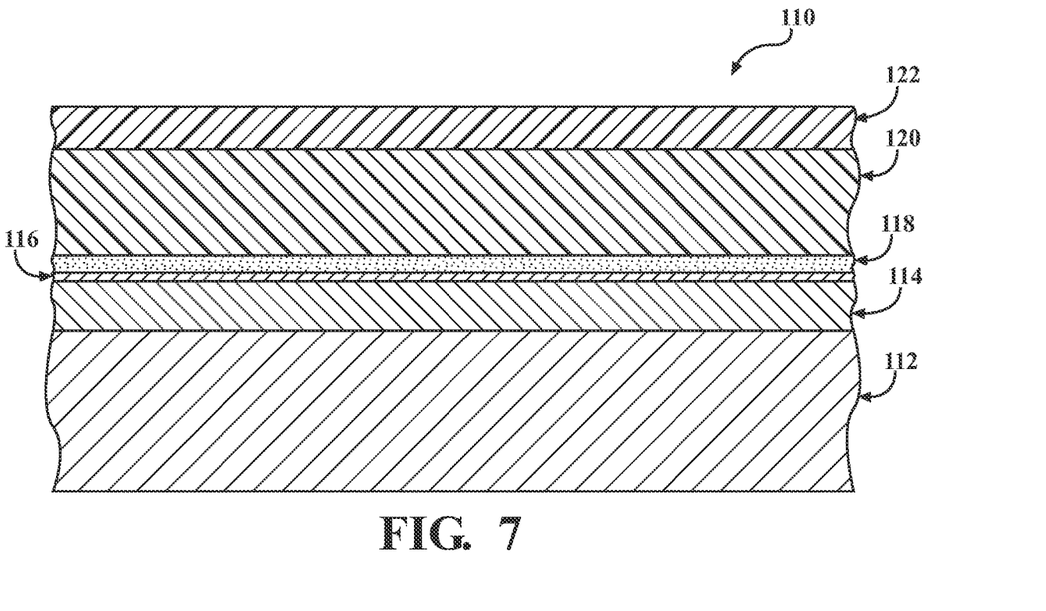
FIG. 7 is a length cutaway illustration of a wall segment of an automotive fluid transport tube according to a seventh non-limiting embodiment and depicting a first layer of a copper plated low carbon steel with welded single wall or double walled brazed tubing, a second layer of a zinc/aluminum alloy, electroplated zinc, or hot-dip aluminum for corrosion protection, an optional conversion coating for passivation, a solvent based primer layer, and top multi-layer coats of extruded polymers or copolymers, of which one or more layers may be reinforced with graphene or graphene oxide powder.

FIG. 7 is a length cutaway illustration of a wall segment of an automotive fluid transport tube according to a seventh non-limiting embodiment, see generally at 110, and depicting a first layer of a copper plated low carbon steel 112 with welded single wall or double walled brazed tubing, a second layer of a zinc/aluminum alloy 114, an electroplated zinc, or hot-dip aluminum for corrosion protection, an optional conversion coating 116 for passivation, and a solvent based primer layer 118.

An extruded polymer or copolymer reinforced with graphene or graphene oxide powder is provided as first 120 and second 122 top coats. Without limitation, any number of multi or subset layers can be incorporated into the outer polymer and copolymer coated metal pipe, with the individual coats each including any combination or sub-combination of materials, including any type of copolymer, as previously described and again not limited to any of a thermoplastic, thermoset, elastomer or other natural or synthetic polymer and which may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

The present invention further contemplates any plurality of extruded polymer top coats which can be provided according to varied thicknesses corresponding to their specific compositions and in order to optimize the desired material properties of the tubing employed in a given application. This can further include, without limitation, segregating the use of the entrained graphene or graphene oxide powder in either of the intermediate 120 or uppermost 122 extruded polymer layers. Without limitation, the present invention envisions the use of any of singular or multiple polymer or copolymer layers, these being provided in any uniform or alternating arrangement.

Figure 8:
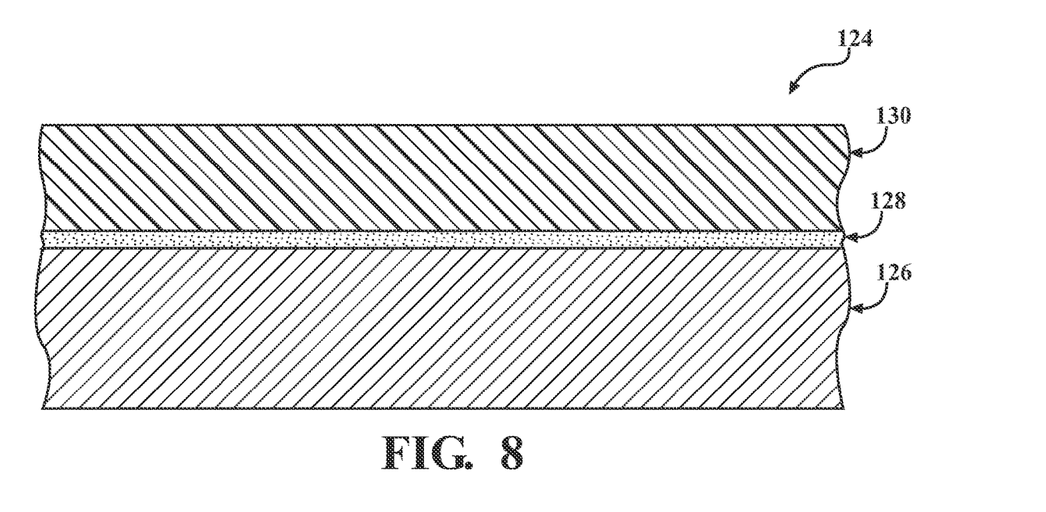
FIG. 8 is a length cutaway illustration of a wall segment of an automotive fluid transport tube according to an eighth non-limiting embodiment and depicting a first or base layer of an extruded aluminum tubing, a second solvent based primer layer and an outer or top coat of an extruded polymer or copolymer reinforced with a graphene or graphene oxide powder.

Proceeding to FIG. 8, a length cutaway illustration is generally shown at 124 of a wall segment of an automotive fluid transport tube according to an eighth non-limiting embodiment and depicting a first or base layer of an extruded aluminum tubing 126, a second solvent based primer layer 128 and an outer or top coat 130 of an extruded polymer or copolymer reinforced with a graphene or graphene oxide powder.

Figure 9:
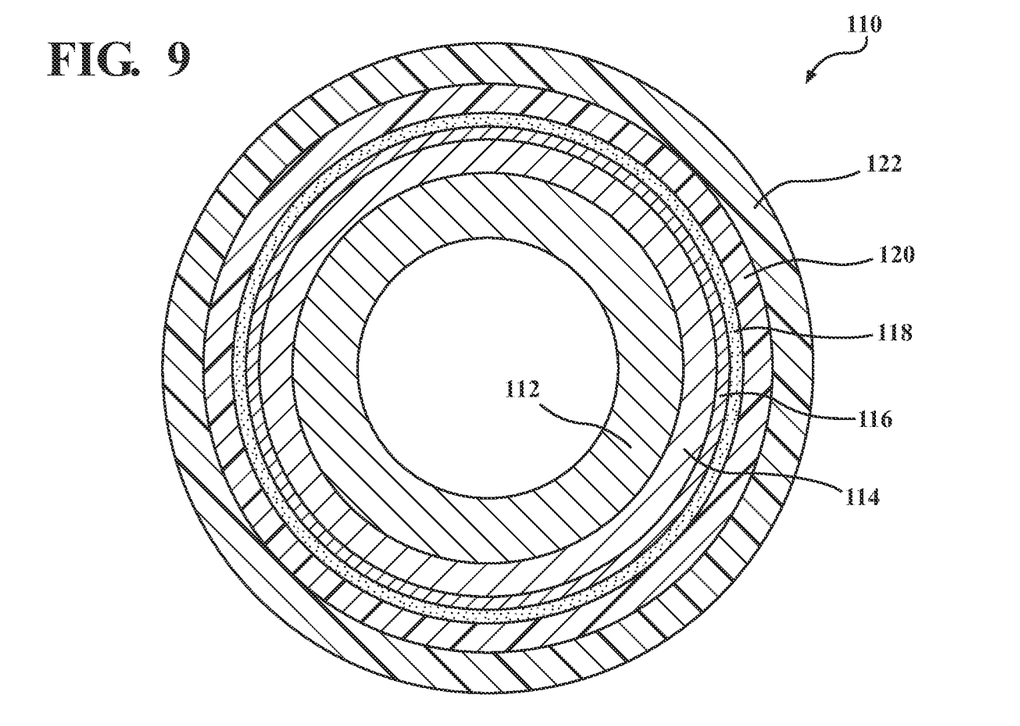
FIG. 9 is an end cutaway illustration of an automotive fluid transport tube representative of the related variants of FIGS. 1-7.
Figure 10:
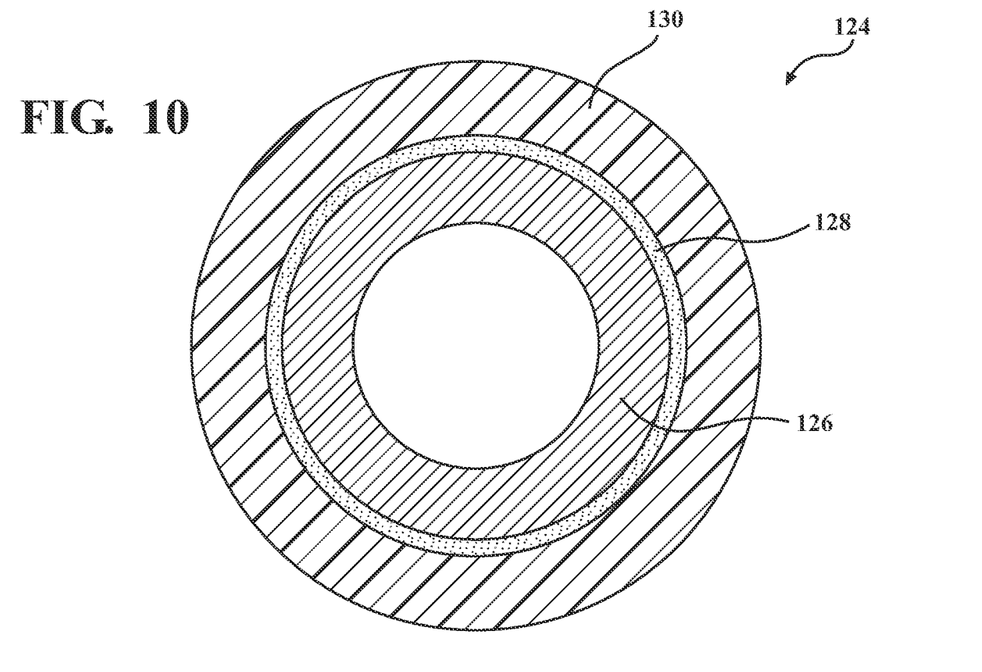
FIG. 10 is an end cutaway illustration of an automotive fluid transport tube corresponding to the variant of FIG. 8.

FIG. 9 is an end cutaway illustration of an automotive fluid transport tube representative of the related variants of FIGS. 1-7 and, by exemplary representation, depicting the layers 112, 114, 116, 118, 120, and 122 as described in FIG. 7. FIG. 10 is an end cutaway illustration of an automotive fluid transport tube corresponding to the variant of FIG. 8 and repeating previously described layers 126, 128 and 130.

Having described my invention, other and additional preferred embodiments will become apparent to those skilled in the art to which it pertains, and without deviating from the scope of the appended claims. This can further include the tubing being constructed, without limitation, of any of a copper plated low carbon steel, low carbon steel, stainless steel, or aluminum. The present invention further contemplates other application processes outside of extrusion for applying the outer polymer layer(s) to the tubing.

Among related variants, this can include the use of any suitable forming process not limited to extrusion and including other injection molding techniques for forming the outer polyamide/graphene powder layer about the inner metal tube and desired combination of intermediate corrosion inhibiting layers.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

We claim:

1. A coated metal pipe for use as an automotive fluid transport tube, comprising:
   a tubing formed into a circular cross sectional profile;
   a solvent based primer layer applied over said tubing; and
   at least one outermost layer including a combination of a non-polyamide copolymer with impact resistant properties along with a polymer incorporating a graphene or graphene oxide powder applied over said primer layer to provide a balance of toughness and hardness.

2. The coated metal pipe of claim 1, said at least one layer of copolymer further comprising any of a thermoplastic, thermoset, elastomer or other natural or synthetic polymer and which may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

3. The coated metal pipe of claim 1, said tubing further comprising any of a copper plated low carbon steel, low carbon steel, stainless steel, or extruded aluminum.

4. The coated metal pipe of claim 3, further comprising a nickel plating applied to an inner diameter of said tubing.

5. The coated metal pipe of claim 1, further comprising any of a corrosion inhibiting zinc/aluminum alloy, electroplated zinc or hot dip aluminum applied directly over said tubing.

6. The coated metal pipe of claim 1, further comprising any of a chrome free conversion coating, primer or primer/adhesive coating, or passivation coating.

7. The coated metal pipe of claim 1, further comprising said graphene or graphene oxide powder being compounded with said polymer in a range of 0.1% to 25% by weight.

8. The coated metal pipe of claim 1, further comprising said non-polyamide copolymer and said polymer being provided as one of multiple layers or a single layer blend.

9. A coated metal pipe for use as an automotive fluid transport tube, comprising:
   a copper plated carbon steel tubing formed into a circular cross sectional profile;
   at least one intermediate layer including a corrosion inhibiting zinc/aluminum alloy, electroplated zinc or hot dip aluminum applied over said tubing; and
   a non-polyamide copolymer layer with impact resistant properties in combination with a polymer layer incorporating a graphene or graphene oxide powder applied over said intermediate layer to provide a balance of toughness and hardness.

10. The coated metal pipe of claim 9, said copolymer layer further comprising any of a thermoplastic, thermoset, elastomer or other natural or synthetic polymer and which may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

11. The coated metal pipe of claim 9, further comprising a nickel plating applied to an inner diameter of said tubing.

12. The coated metal pipe of claim 9, said tubing further comprising any of a copper plated low carbon steel, low carbon steel, stainless steel, or aluminum.

13. The coated metal pipe of claim 9, further comprising any of a chrome free conversion coating, primer or primer/adhesive coating, or passivation coating.

14. The coated metal pipe of claim 9, further comprising said graphene or graphene oxide powder being compounded with said copolymer in a range of 0.1% to 25% by weight.

15. The coated metal pipe of claim 9, further comprising said non-polyamide copolymer layer and said polymer layer being provided as one of multiple layers or as a single layer blend.

16. The coated metal pipe of claim 9, further comprising said intermediate layer being selected from a group consisting of a chrome free conversion coating, primer or primer/adhesive coating, or passivation coating copper coating.

17. A method for manufacturing a coated metal pipe for use as an automotive fluid transport tube, comprising the steps of:
   forming a copper plated carbon steel into a tubing exhibiting a circular cross sectional profile;
   forming at least one intermediate primer layer including a corrosion inhibiting zinc/aluminum alloy, electroplated zinc or hot dip aluminum applied over said tubing; and
   forming an outer non-polyamide copolymer layer with impact resistant properties in combination with a polymer incorporating a graphene or graphene oxide powder applied over the intermediate layer to provide a balance of toughness and hardness.

18. The method as described in claim 17, further comprising the step of applying a nickel plating to an inner diameter of the tubing.

19. The method as described in claim 17, further comprising the step of the intermediate layer being selected from a group consisting of a chrome free conversion coating, primer or primer/adhesive coating, or passivation coating copper coating.

20. The method as described in claim 17, said at least one layer of copolymer further comprising the step of the copolymer layer being selected from a group consisting of any of a thermoplastic, thermoset, elastomer or other natural or synthetic polymer and which may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

21. The method as described in claim 17, further comprising the step of forming the copper plated carbon steel tubing by either of a double wall brazed or singe wall welded construction.

* * * * *